United States Patent

Robichaux et al.

[11] Patent Number: 5,970,943
[45] Date of Patent: Oct. 26, 1999

[54] SYSTEM AND METHOD FOR MODE SELECTION IN A VARIABLE DISPLACEMENT ENGINE

[75] Inventors: Jerry D. Robichaux, Lincoln Park; Bradley J. Hieb, Dearborn, both of Mich.

[73] Assignee: Ford Global Technologies, Inc., Dearborn, Mich.

[21] Appl. No.: 08/400,066

[22] Filed: Mar. 7, 1995

[51] Int. Cl.$^6$ .................................................. F02B 77/00
[52] U.S. Cl. ...................................................... 123/198 F
[58] Field of Search ........................................ 123/198 F

[56] References Cited

U.S. PATENT DOCUMENTS

| | | | |
|---|---|---|---|
| 4,256,074 | 3/1981 | Sugasawa et al. | 123/198 F |
| 4,494,503 | 1/1985 | Danno et al. | 123/198 F |
| 5,038,739 | 8/1991 | Ishii | 123/198 F |
| 5,190,017 | 3/1993 | Cullen et al. | 123/571 |
| 5,331,936 | 7/1994 | Messih et al. | 123/480 |
| 5,408,974 | 4/1995 | Lipinski et al. | 123/198 F |

OTHER PUBLICATIONS

"4, 6, 8 . . . Which Cylinder Shall We Operate?", *Motor*, Jun. 25, 1983, pp. 52–53.

D. Stojek and D. Bottomley, "The Ford 3x6 Engine", Proceedings IMech vol. 198D, No. 15.

G. Berta, M. Troilo, "Cylinder Shut–off and Pressure Charging for Lower Fuel Consumption", SAE 82072.

K. Schellman and W. Schmid, "Possibilities by Saving Fuel by Switching Off Cylinders", Fuel Economy Research Conference, Unknown data & location.

T. Fukui, T. Nakagami, H. Endo, T. Katsumoto and Y. Danno, "Mitsubishi Orion–MD, A New Variable Displacement Engine," SAE 831007.

B. Bates, J. Dosdall and D. Smith, "Variable Displacement by Engine Valve Control", SAE Paper 780145, 1978.

Nonlinear Low Frequency Phenomenological Engine Modeling and Analysis, by B. K. Powell and J. A. Cook, Proceedings of the 1987 American Control Conference, Minneapolis, MN, Jun. 10–12, 1987, pp. 332–340.

*Primary Examiner*—Noah P. Kamen
*Attorney, Agent, or Firm*—Jerome R. Drouillard

[57] ABSTRACT

A system and method for selecting the operating mode of a variable displacement engine includes a controller with a stored engine map, an engine speed sensor, and an inferred desired fractional manifold vacuum which would be required for the engine to operate on a fractional number of cylinders, given the driver's current torque requirements, a specific emissions calibration, and environmental conditions, deriving this inferred desired fractional manifold vacuum from stored information and assorted engine sensor input. The system compares its inferred desired fractional manifold vacuum and current engine speed to one or more stored maps of inferred desired fractional manifold vacuum versus engine speed in order to decide which operating mode should be selected.

1 Claim, 4 Drawing Sheets

SYSTEM AND METHOD FOR MODE SELECTION IN A VARIABLE DISPLACEMENT ENGINE

FIELD OF THE INVENTION

The present invention relates to a system for determining when to operate less than the maximum possible number of cylinders of a multi-cylinder variable displacement engine, and, more particularly, to utilizing inferred desired manifold vacuum to make this determination.

DESCRIPTION OF THE RELATED ART

Automotive vehicle designers and manufacturers have realized for years that it is possible to obtain increased fuel efficiency by operating an engine on less than its full complement of cylinders during certain running conditions. Accordingly, at low speed, low load operation, it is possible to save fuel by operating, for example, an eight cylinder engine on only four or six cylinders, or a six cylinder engine on only three or four cylinders. In fact, one manufacturer offered a 4-6-8 variable displacement engine several years ago. Also, Ford Motor Company designed a six cylinder engine which was capable of operating on three cylinders. While never released for production, Ford's engine was developed to a highly refined state. Unfortunately, both of the aforementioned engines suffered from deficiencies associated with their control strategies. Specifically, customer acceptance of the engine actually in production was unsatisfactory because the powertrain tended to "hunt" or shift frequently between the various cylinder operating modes. In other words, the engine would shift from four to eight cylinder operation frequently, producing noticeable torque excursions. This unfavorably caused the driver to perceive excessive changes in transmission gear in the nature of downshifting or upshifting. Additionally, prior art systems did not always consider whether the driver's demand for torque could be met by a fractionally operating engine before deciding to operate in fractional mode. Decisions were often based on direct measurements of real-time parameters, without considering how those parameters would be affected by fractional operation.

As detailed in U.S. patent application Ser. No. 08/172,359 Ford initially addressed some of the aforementioned concerns by utilizing inferred engine load based on accelerator control position as a decision criteria. The present invention is directed at improving this system by utilizing a more precise set of engine information in deciding whether to operate an engine on less than its full complement of cylinders.

SUMMARY OF THE INVENTION

A system for determining a number of cylinders to operate in a variable displacement engine includes means for inferring a manifold vacuum required to accommodate a driver's desired torque and a specific emissions calibration for the fractional operation of the variable displacement engine, an engine speed sensor for sensing current engine speed, and a controller for determining whether the variable displacement engine should be operated on a maximum number of cylinders or on a fraction thereof, the controller including storage for a fractional operation indicator, storage for one or more engine speed limits, and storage for one or more inferred desired fractional manifold vacuum limits such that comparisons may be made for the purpose of determining whether to recommend fractional operation.

A primary object of the present invention is to provide a new and improved system for determining when to operate less than the maximum possible number of cylinders of a multi-cylinder variable displacement engine. More specifically, it is an object of the present invention to utilize inferred desired manifold vacuum to define the limits to such fractional operation.

A primary advantage of this invention is that it more directly addresses the driver's demand for torque and accounts for the emissions calibration and environmental conditions in deciding whether to operate in fractional mode. An additional advantage is that the invention minimizes mode shifting by using an inferred parameter as a basis for deciding whether to operate in fractional mode, so that decisions to switch modes are based on a consistent method of computation. Yet another advantage is that the system can be adapted for a variety of engines by customizing the stored limit criteria for the particular application.

Other objects, features, and advantages will be apparent from a study of the following written description and drawings,

DETAILED DESCRIPTION OF THE PREFERRED EMBODIMENTS

Figure 1:
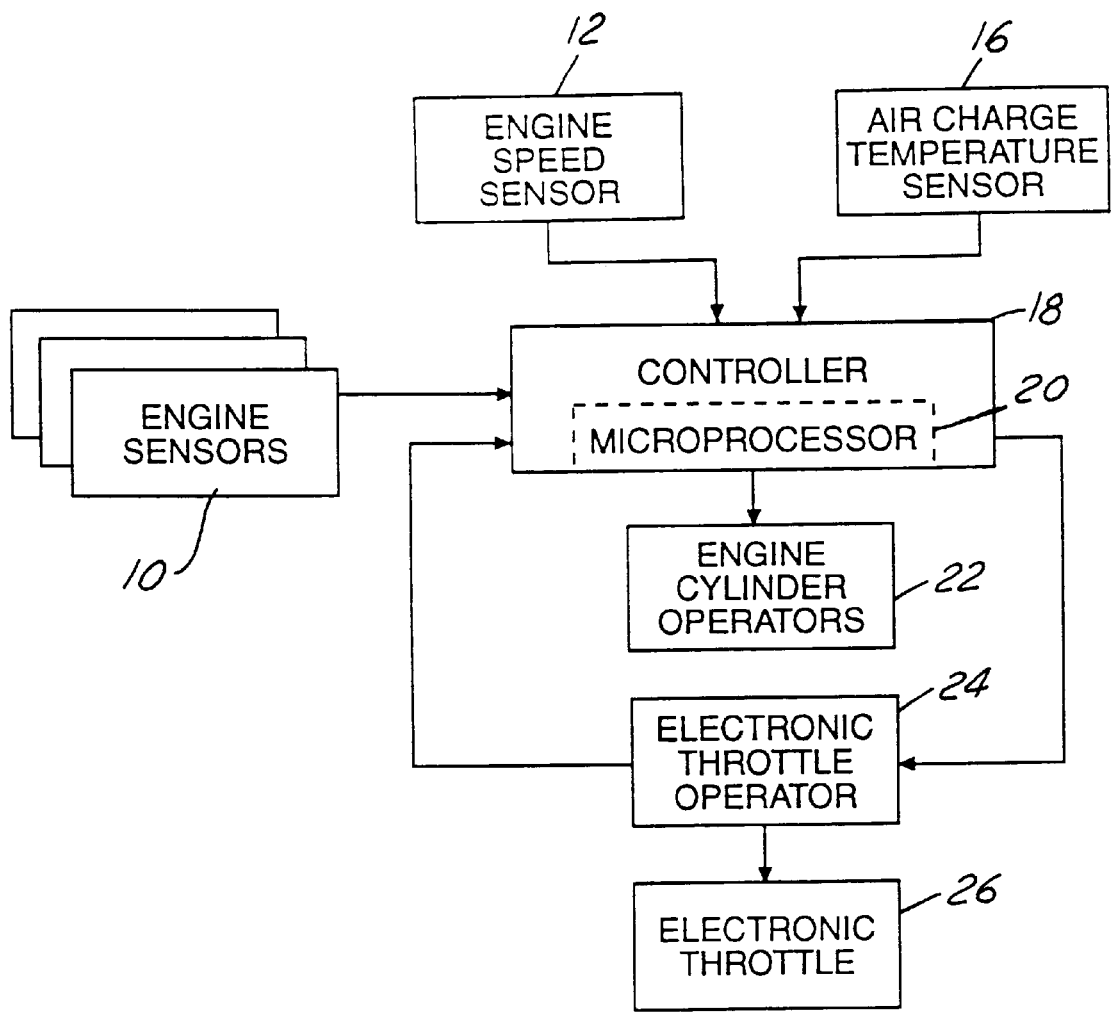
FIG. 1 is a block diagram of a variable displacement engine mode selection system according to the present invention.

Referring to FIG. 1, a mode selection system for a variable displacement engine has an engine speed sensor 12 for sensing engine speed, an air charge temperature sensor 16 for measuring the temperature of the air flowing into the engine, and additional assorted engine sensors 10 for measuring other engine characteristics and inferring the angle of the accelerator pedal controlled by the driver. Sensors 10, 12, 16 provide signals to a controller 18 of the type commonly used for providing engine control. Controller 18 includes a microprocessor 20 that utilizes input from various sensors such as sensors 10, 12, and 16, which may include air charge temperature, engine speed, engine coolant temperature, and other sensors known to those skilled in the art and suggested by this disclosure. In addition to sensor input, microprocessor 20 also utilizes its own stored information (not shown), which may include limit values for various engine parameters or time-oriented data. Controller 18 may operate spark timing/control, air/fuel ratio control, exhaust gas recirculation (EGR), intake airflow, and other engine and power transmission functions. In addition, through a plurality of engine cylinder operators 22, controller 18 has the capability of disabling selected cylinders in the engine, causing the engine to have a decreased effective displacement. An engine operating with less than its full complement of cylinders is said to be in fractional mode, as opposed to maximum mode which utilizes all engine cylinders to provide maximum effective displacement. For example, with an eight-cylinder engine, controller 18 may operate the engine on three, four, five, six, seven, or eight cylinders, as the driver's demanded torque, a specific emissions calibration, and environmental conditions warrant. Those skilled in the art will appreciate in view of this disclosure that a number of different disabling devices are available for selectively rendering inoperative one or more engine cylinders. Such devices include mechanisms for preventing any of the cylinder valves in a disabled cylinder from opening, such that gas remains trapped within the cylinder.

Controller 18 operates electronic throttle operator 24, which may comprise a torque motor, stepper motor, or other type of device which positions an electronic throttle 26. Electronic throttle 26 is different from a mechanical throttle, which may be employed in connection with a manually operable accelerator control. Electronic throttle operator 24 provides feedback to controller 18 regarding the position of the electronic throttle 26.

Figure 2:
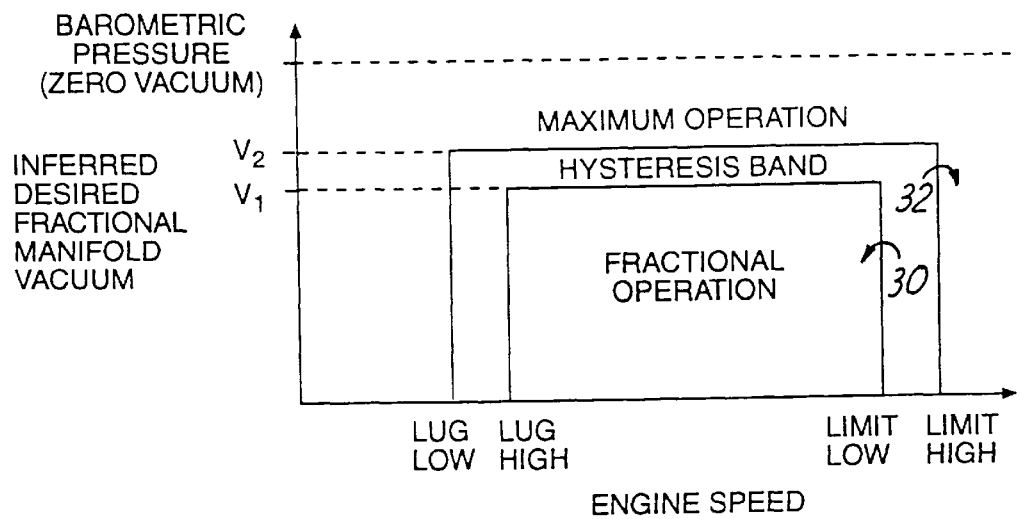
FIG. 2 illustrates an engine mode selection map for a preferred embodiment, where mode is a function of inferred desired fractional manifold vacuum, engine speed, and current engine operation.

As shown in the engine mode selection map of FIG. 2, the present invention utilizes inferred desired fractional manifold vacuum, engine speed, and the engine's current mode of operation in deciding whether to operate in fractional or maximum mode, with limit information being stored within the controller. Engine speed is shown on the horizontal axis. In a preferred embodiment, engine speed is expressed in RPM, with values increasing from left to right along the horizontal axis. For example, LUG LOW might represent 400 RPM, LUG HIGH might be 900 RPM, LIMIT LOW might be 2000 RPM, and LIMIT HIGH might be 2250 RPM.

Still referring to FIG. 2, inferred desired fractional manifold vacuum is shown on the vertical axis. Inferred desired fractional manifold vacuum is an estimate of the amount of manifold vacuum which would be desirable in a variable displacement engine operating on a fractional number of cylinders, given the driver's current demand for torque, present engine conditions, and accompanying emissions calibration, as dictated by spark timing and EGR concentration. In a preferred embodiment, inferred desired fractional manifold vacuum is expressed in inches of mercury, with $V_1$ representing, for example, four inches of mercury, and $V_2$ representing two inches of mercury. Moving from bottom to top along the vertical axis, vacuum decreases, equaling zero at the point where it matches current barometric pressure. Note that while $V_1$ and $V_2$ are shown as constants, they may also be linear or nonlinear functions, or even collections of irregular data values.

Fractional operation is recommended when the operating point which corresponds to the inferred desired fractional manifold vacuum and the engine speed is located within the inner area denoted FRACTIONAL OPERATION. Conversely, when the operating point is located in the outer area denoted MAXIMUM OPERATION, maximum mode is recommended. When the point is located within the area marked HYSTERESIS BAND, current engine mode is used to determine which combination of limits should be used, $V_1$/LUG HIGH/LIMIT LOW or $V_2$/LUG LOW/LIMIT HIGH. A fractional operation indicator stored within controller 18 of FIG. 1 is used to track current engine mode.

Referring again to FIG. 2, maximum-to-fractional arrow 30 indicates that the $V_1$/LUG HIGH/LIMIT LOW combination should be used when the engine is currently operating in maximum mode. Fractional-to-maximum arrow 32 indicates that the $V_2$/LUG LOW/LIMIT HIGH combination should be used when the engine is currently operating in fractional mode. This variability in limits provides a smoothing effect to reduce the likelihood of excessive mode switching.

For example, when the engine is first started, engine speed is less than LUG LOW, causing the engine to operate in the maximum mode according to the map. Because of the hysteresis band, a recommendation to operate in fractional mode will not be made until the engine speed is within the LUG HIGH/LIMIT LOW boundaries and the inferred desired fractional manifold vacuum is less than or equal to $V_1$. However, once the engine meets these criteria and begins to operate in fractional mode, it will continue this fractional operation until the engine speed falls outside the LUG LOW/LIMIT HIGH boundaries or the inferred desired fractional manifold vacuum exceeds $V_2$.

Figure 3:
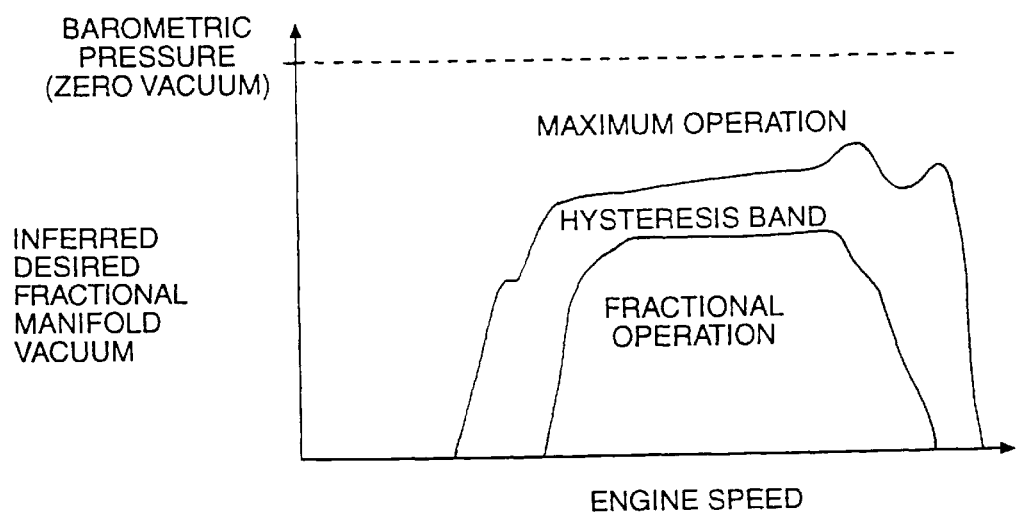
FIG. 3 illustrates an engine mode selection map for an alternative embodiment showing mode as nonlinear functions of inferred desired fractional manifold vacuum, engine speed, and current engine operation.

The engine mode selection map of FIG. 3 shows an alternative embodiment in which the preferred mode is established using nonlinear functions of inferred desired fractional manifold vacuum, engine speed, and current engine mode. Such functions might be derived based on operating characteristics of a particular engine, taking into account a variety of factors including emissions and powertrain features, As in FIG. 2, the vertical axis of FIG. 3 reflects inferred desired fractional manifold vacuum, which equals zero at barometric pressure and increases in a downward direction.

Figure 4:
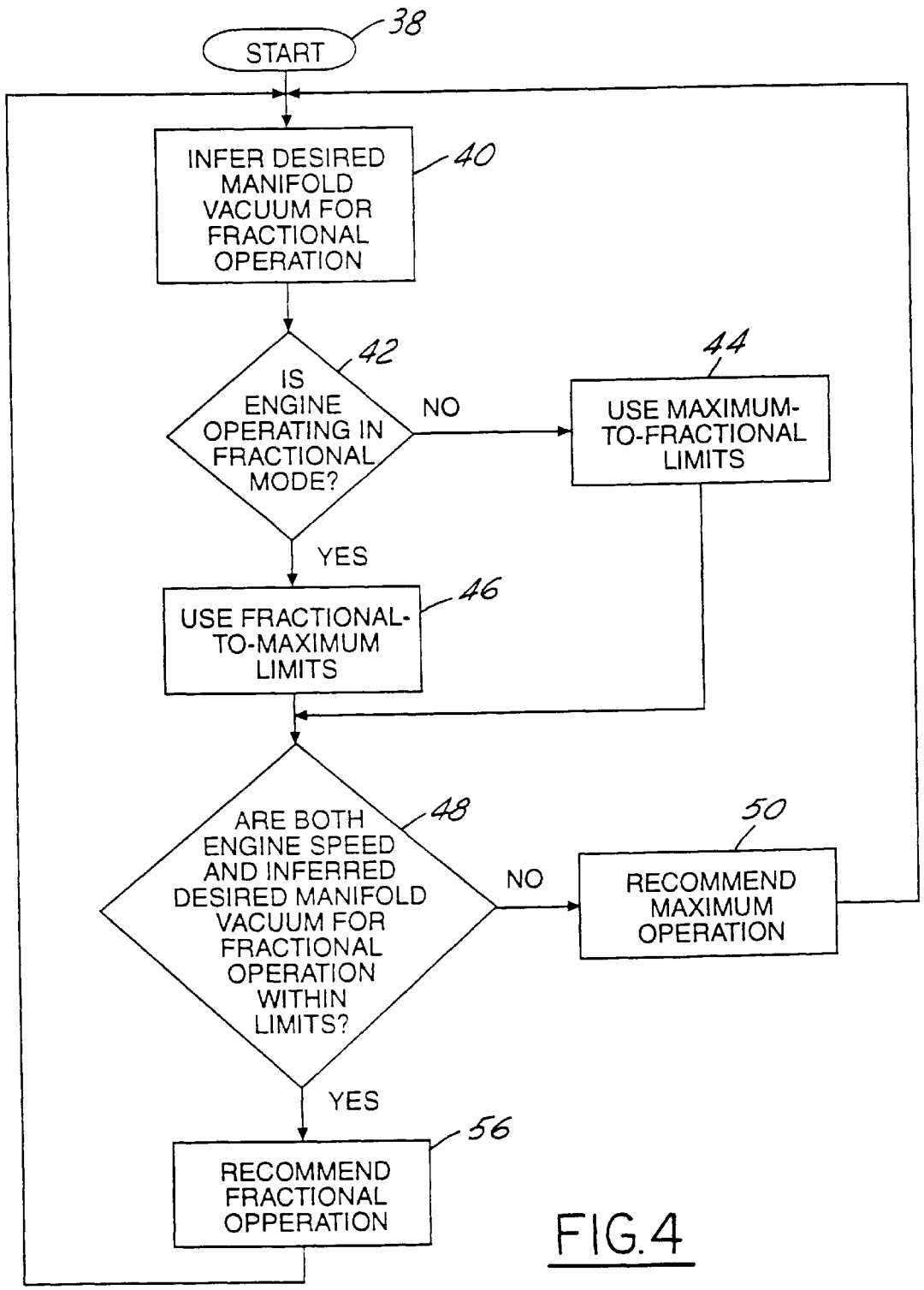
FIG. 4 is a flow chart of a preferred embodiment showing a mode selection process for a variable displacement engine according to the present invention.

Turning now to FIG. 4, a preferred embodiment of the method for selecting the operating mode of a variable displacement engine begins at block 38 with the start of the program. At block 40, the controller infers a desired manifold vacuum for a fractionally operating engine which corresponds to the driver's current demand for torque, present engine conditions, and accompanying emissions calibration, as dictated by spark timing and EGR concentration. This inferred desired manifold vacuum is always determined based on a fractionally operating engine, independent of the engine's real-time operating state, hence the term inferred desired fractional manifold vacuum. Inferring the desired fractional manifold vacuum provides stable decision criteria throughout all operating modes, unlike measuring manifold vacuum, which reflects only the engine's current mode of operation. Inferred desired fractional manifold vacuum is important because it reflects an estimate of the manifold vacuum which the engine will have to achieve in order to operate successfully in fractional mode. If a fractionally operating engine would not be able to meet the driver's demanded torque and specific emissions calibration under the current engine and atmospheric conditions, which are reflected in the inferred desired fractional manifold vacuum, then maximum mode should be recommended. Those skilled in the art will recognize that various methods for inferring manifold vacuum may be chosen. It is the use of inferred desired fractional manifold vacuum as a decision criteria that forms the core of the present invention.

Continuing with FIG. 4, at block 42 the controller checks the current engine mode to determine which engine map limits should be utilized. If the engine is currently in maximum mode, then maximum-to-fractional limits are used for engine speed and desired fractional manifold vacuum, as shown by block 44. If the engine is currently in fractional mode, then fractional-to-maximum limits are used for engine speed and desired fractional manifold vacuum, as shown by block 46. At block 48 the controller checks to ascertain whether both engine speed and inferred desired fractional manifold vacuum are within the selected limits defined by a stored engine mode selection map. If either engine speed or inferred desired fractional manifold vacuum are outside the defined limits, then maximum operation is recommended as shown at block 50, and the controller continues with block 40. If both are within the defined limits, then at block 56 the controller recommends fractional operation. The controller then continues with block 40.

Figure 5:
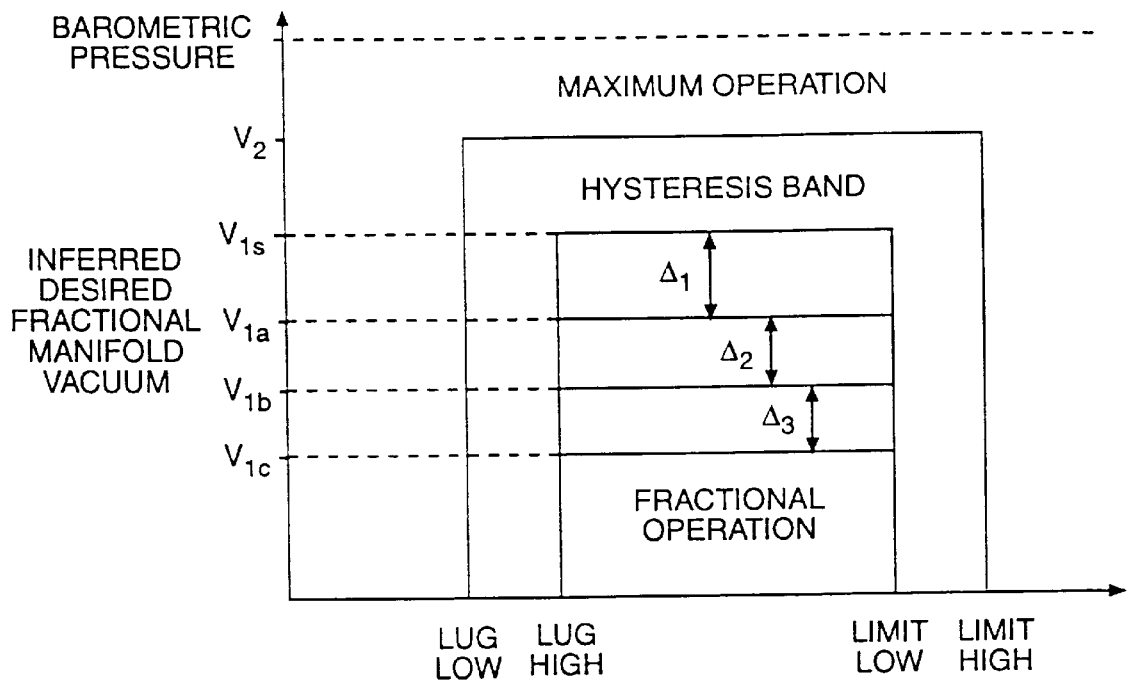
FIG. 5 illustrates an engine mode selection map for an alternative embodiment where an inferred desired fractional manifold vacuum limit is adjusted during the course of engine operation.

Turning now to FIG. 5, an engine mode selection map for an alternative embodiment of the present invention is fundamentally similar to that of FIG. 2 but includes a variable limit for the $V_1$ transition level of inferred desired fractional manifold vacuum, as represented by $V_{1s}$, $V_{1a}$, $V_{1b}$, and $V_{1c}$. The actual value selected for $V_1$ on a particular occasion may be a function of time or mode switching frequency, and the amount of variation as represented by $\delta1$, $\delta2$, and $\delta3$ may change with current vehicle speed or other operating conditions. The system begins with $V_1$ set to the point $V_{1s}$ and changes this limit each time the engine changes modes, afterwards allowing $V_1$ to approach the predetermined static value as represented by $V_{1s}$. This dynamic limit for $V_1$ effectively widens the real-time hysteresis band for transitions into fractional mode, and it can be used to add stability and make transitions more smooth under particular environmental conditions where many transitions might ordinarily take place. While this embodiment adjusts the $V_1$ limit with every mode transition, less frequent changes may also be accomplished if desirable. Similarly, adjusting $V_2$ may also be desirable.

Figure 6:
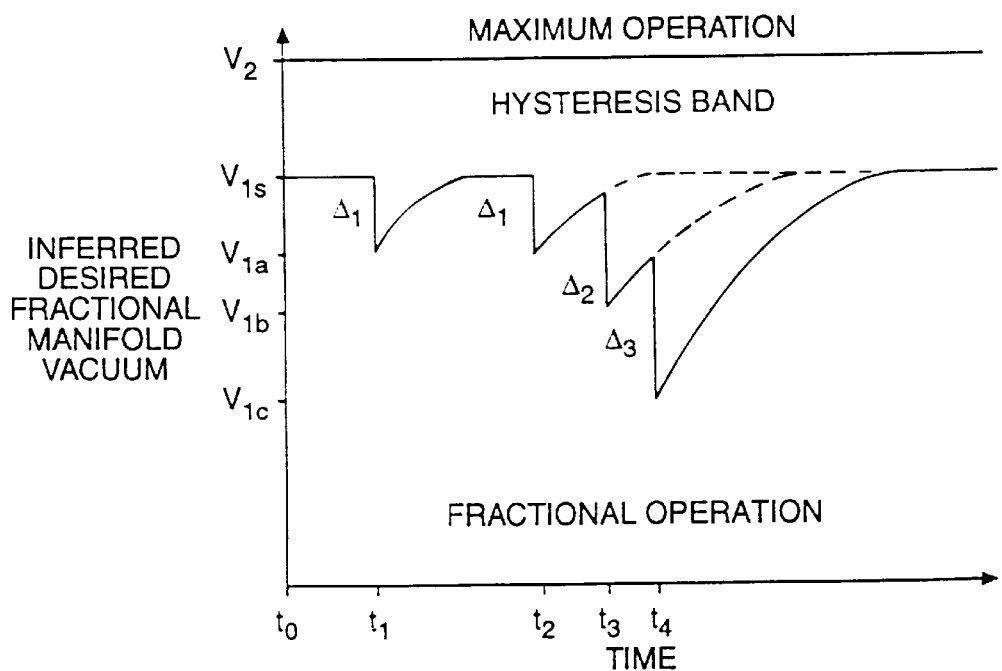
FIG. 6 is a timing diagram illustrating adjustments to an inferred desired fractional manifold vacuum limit over time.

Turning now to FIG. 6, a timing diagram illustrates an example of adjustments to an inferred desired fractional manifold vacuum limit over time. Time increases from left to right on the horizontal axis, and manifold vacuum decreases from bottom to top on the vertical axis. Inferred desired manifold vacuum limits $V_2$ and $V_{1s}$ initially define the hysteresis band as shown on the left at time $t_0$. At time $t_1$, a transition is made which causes the system to increase the vacuum limit $V_1$ by $\delta1$, so it increases from $V_{1s}$ to $V_{1a}$. After the transition, the limit returns to the initial $V_{1s}$ value, using a restorative function of $e^{-t/\tau}$ where $\tau$ represents a time constant chosen by the system to achieve the desired smoothing effect. Note that while this preferred embodiment utilizes a restorative function of $e^{-t/\tau}$, other restorative functions may also be utilized. Note also that the time constant $\tau$ may be varied dynamically to permit faster or slower recovery as circumstances warrant.

Continuing with FIG. 6, at time $t_2$ another transition is made, causing the $V_1$ limit to be increased by $\delta1$ to $V_{1a}$. For simplicity, this change has been drawn to mirror the change which took place at $t_1$, but this would not necessarily be true under actual operating conditions. Afterwards, the limit once again attempts to restore itself to the original value, but at $t_3$ another transition occurs before it can do so, causing the limit to be increased by $\delta2$ to the value represented by $V_{1b}$.

Similarly, the subsequent attempt at restoring $V_1$ to the level of $V_{1s}$ is interrupted by yet another transition at $t_4$. This transition causes the limit to be increased by $\delta3$ to a still larger vacuum represented by $V_{1c}$. Note that at this point, the hysteresis has been dramatically widened to reduce the frequency of transitions for smoother operation. Afterwards, the limit restores itself over time to the original value represented by $V_{1s}$.

From the foregoing description, one ordinarily skilled in the art can easily ascertain the essential characteristics of this invention and, without departing from the spirit and scope of the claims, can make various changes and modifications to the invention to adapt it to various usages and conditions.

We claim:

1. A method of determining a number of cylinders to operate in a variable displacement engine having a desired torque and a specific emissions calibration, comprising the steps of:

sensing a present engine speed of the variable displacement engine;

inferring a desired fractional manifold vacuum required to accommodate the desired torque and the specific emissions calibration for the variable displacement engine operating on a fractional number of cylinders;

detecting whether the variable displacement engine is operating on a fractional number of cylinders;

selecting a limit function according to the results of said detecting step, the limit function utilizing the present engine speed and the inferred desired fractional manifold vacuum;

determining an adjustment to the limit function and adjusting the limit function by said adjustment while operating the variable displacement engine;

evaluating the limit function at the present engine speed and the inferred desired fractional manifold vacuum to generate a limit function result; and generating an operating mode signal to the variable displacement engine according to the limit function result.

* * * * *